Figure 1:
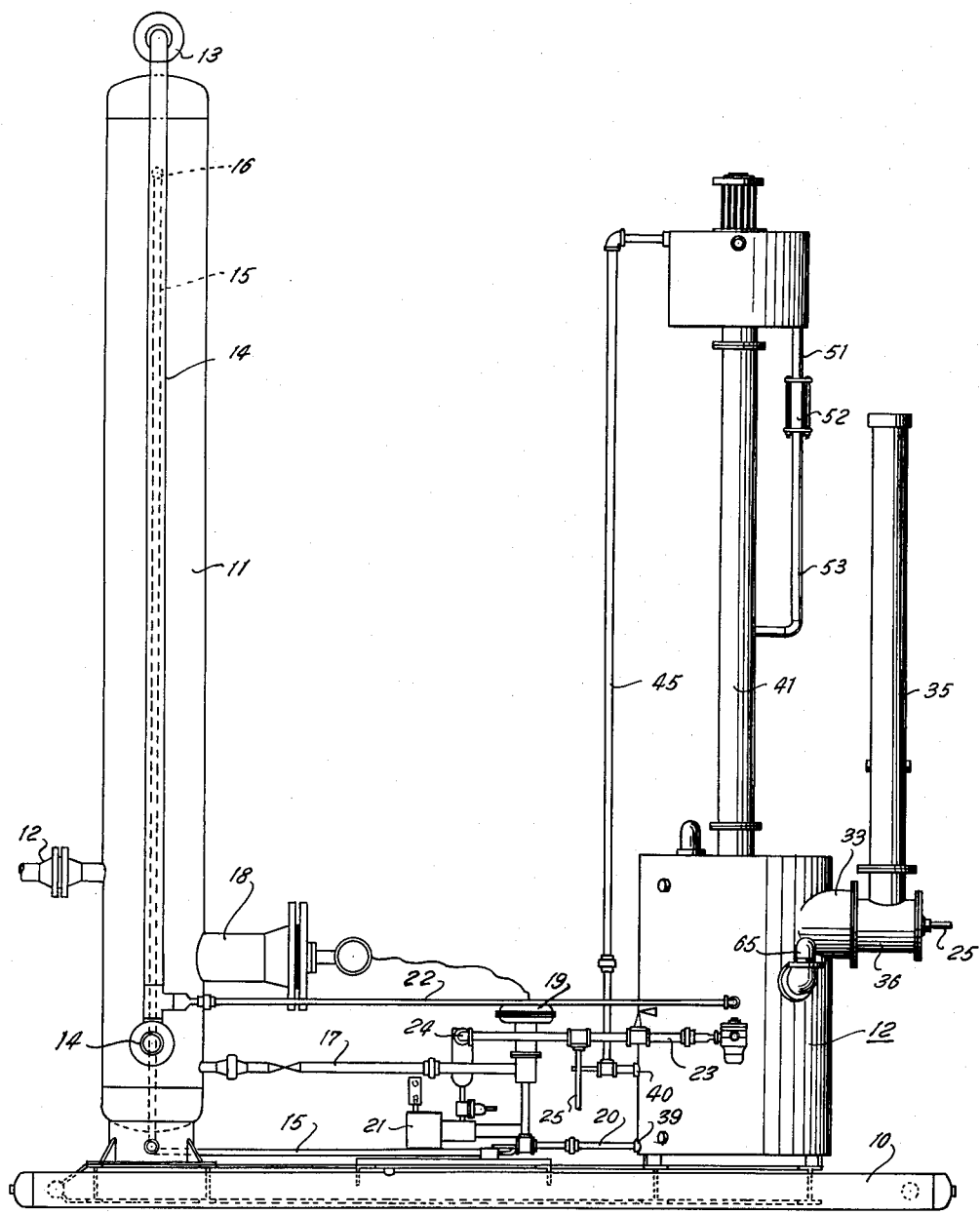
Figure 4:
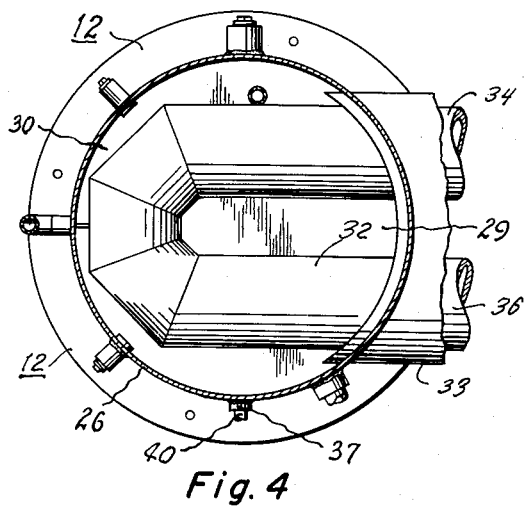
Figure 5:
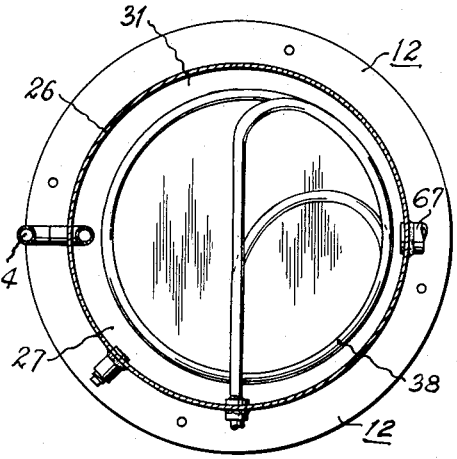
Figure 6:
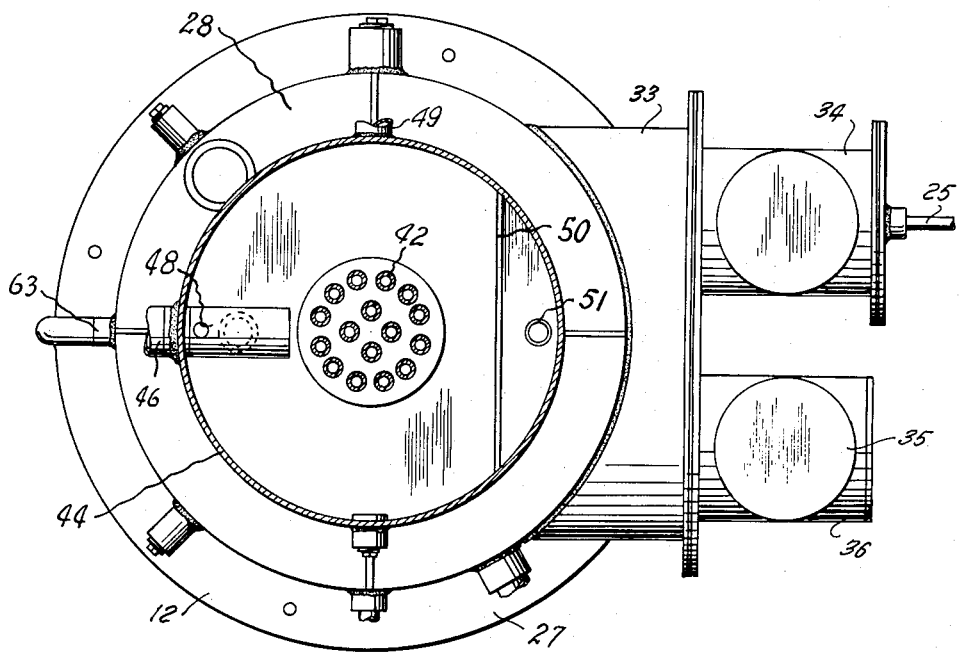

June 12, 1956     C. O. MEYERS     2,750,331
DESICCANT RECONCENTRATOR

Filed July 28, 1954     4 Sheets-Sheet 1

INVENTOR
Charles O. Meyers

BY

ATTORNEYS

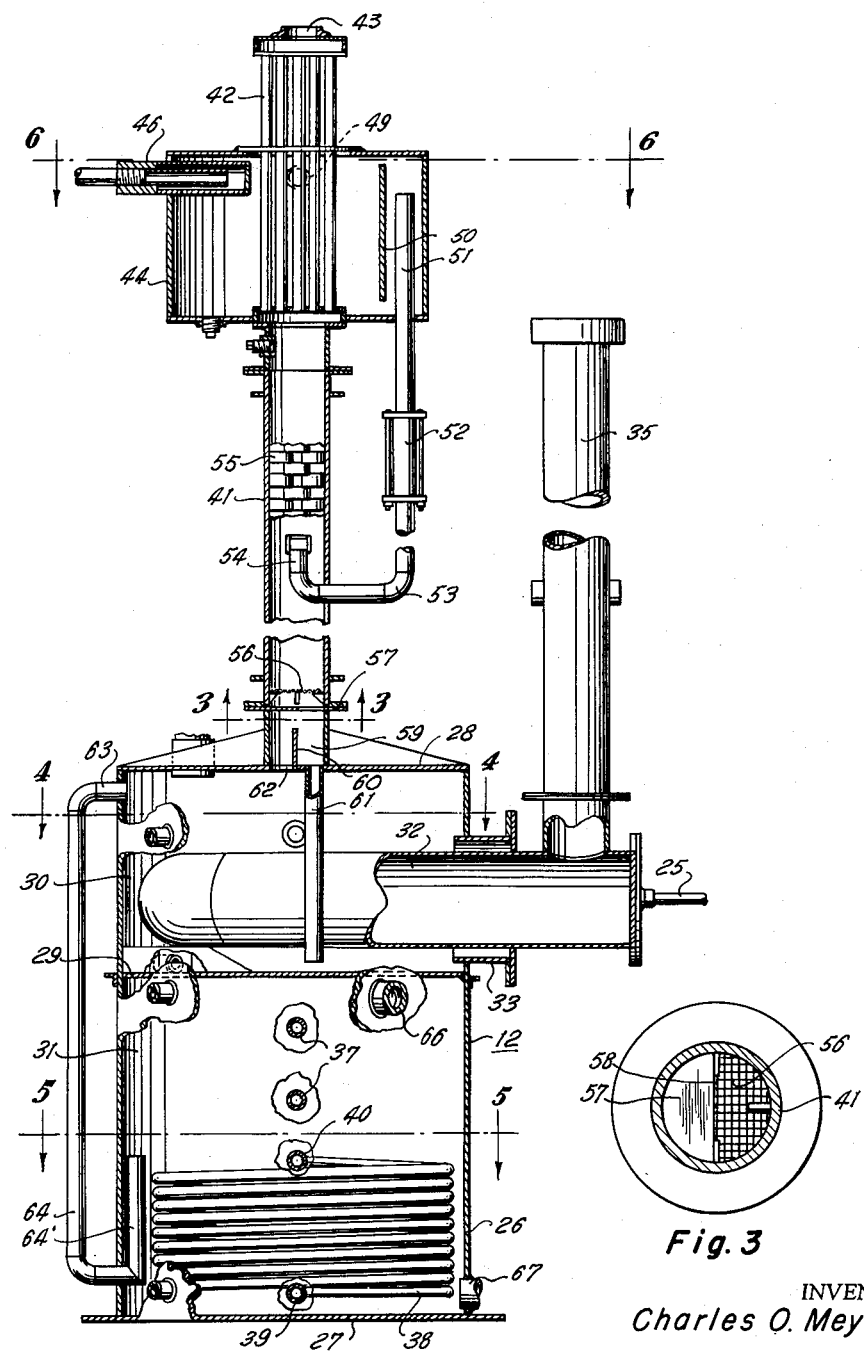

June 12, 1956  C. O. MEYERS  2,750,331
DESICCANT RECONCENTRATOR
Filed July 28, 1954  4 Sheets-Sheet 3

INVENTOR
Charles O. Meyers
BY Ashley & Ashley
ATTORNEYS

June 12, 1956  C. O. MEYERS  2,750,331
DESICCANT RECONCENTRATOR
Filed July 28, 1954  4 Sheets-Sheet 4
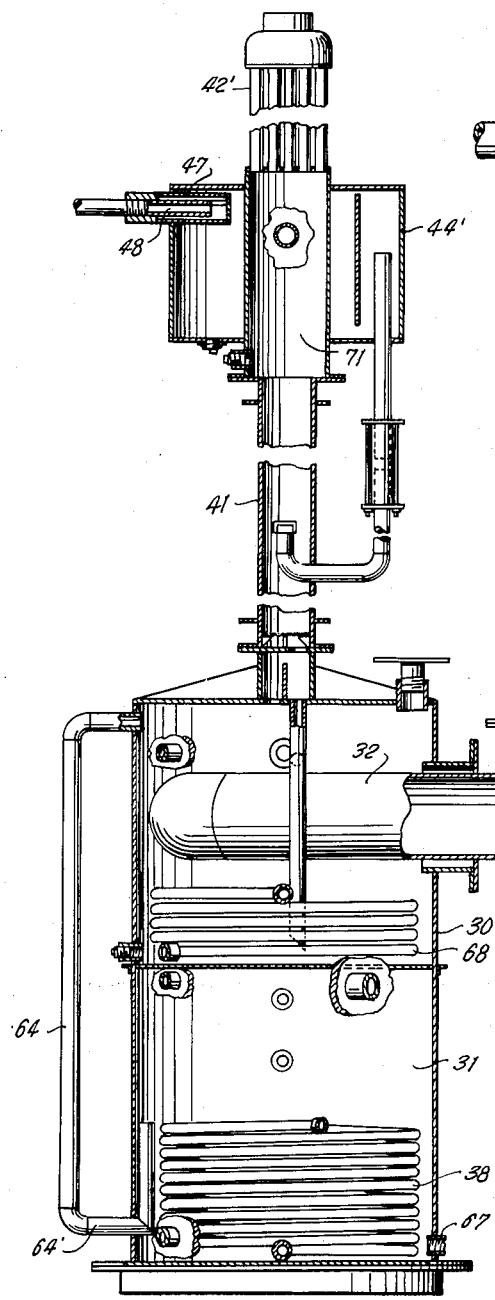
Fig. 7
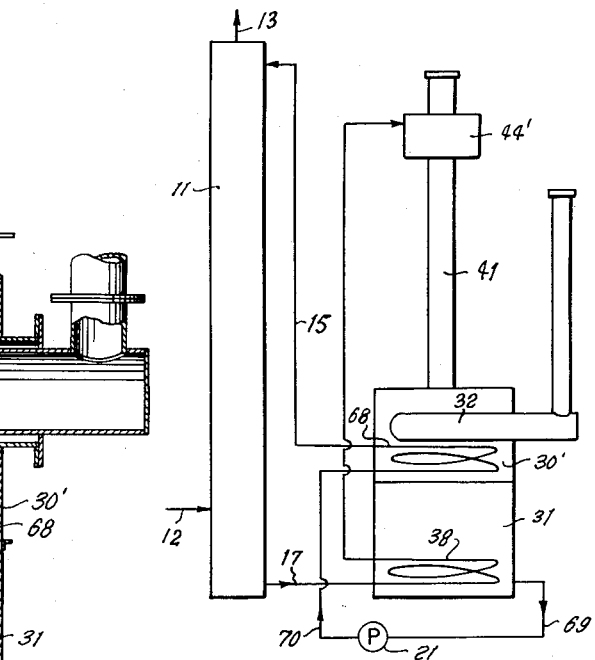
Fig. 8
Fig. 9
INVENTOR.
Charles O. Meyers
BY
Ashley & Ashley
ATTORNEYS United States Patent Office 2,750,331
Patented June 12, 1956

2,750,331

DESICCANT RECONCENTRATOR

Charles O. Meyers, Tulsa, Okla., assignor to National Tank Company, Tulsa, Okla., a corporation of Nevada Application July 28, 1954, Serial No. 446,275

6 Claims. (Cl. 202—153)

This invention relates to new and useful improvements in gas dehydrators.

The invention is particularly concerned with dehydrators for natural gas in which a liquid desiccant, such as a glycol is employed, and is concerned primarily with the reconcentrator unit in which absorbed water is removed from the desiccant to permit recirculation thereof for absorption of moisture from additional quantities of gas.

In general, in this type of system, a stream of natural gas is passed through a contactor enclosure such as a pressure tower or vessel, and is there brought into intimate contact with a stream of desiccant, such as glycol, having a relatively low water vapor pressure. The desiccant absorbs water or moisture from the gas stream in a continuous fashion as the gas flows through the contactor enclosure, thus reducing the water vapor dew point of the gas stream to the desired level for further handling or transportation of the gas. The desiccant which has absorbed water and hence has an increased water vapor pressure, is then circulated to a reconcentrator wherein the absorbed water is removed or separated from the desiccant, whereupon the reconcentrated desiccant may be returned to the contactor enclosure for absorption of moisture from further quantities of gas. The systems are continuous in operation with the gas stream passing constantly through the contactor enclosure and being dehydrated therein, while the desiccant flows continuously in a closed cycle through the contactor to absorb water and through the reconcentrator wherein the absorbed water is removed.

A principal object of this invention is to provide an improved system of the character described which is very simple and compact in structure, reliable in operation, and constructed in such manner as to provide heat exchange between the various quantities of desiccant to bring the desiccant to the desired temperature at each point in the system.

A particular object of the invention is to provide a system of the character described wherein the reconcentrator includes a heating chamber arranged above a surge chamber in a single vessel with means for passing the incoming, water-containing desiccant prior to passage of the latter to the contactor enclosure; and which may be modified by passage of the reconcentrated desiccant in heat exchange with the heating chamber to prevent freezing or congealing of the desiccant in its passage between the reconcentrator and the contactor.

An important object of the invention is to provide a system of the character described in which provision is made for removing from the dilute desiccant any distillate or liquid hydrocarbons which may be present therein as a result of having been absorbed from the gas stream by the desiccant in the contactor enclosure, such removal and conservation of distillate or other hydrocarbons taking place prior to extensive heating of the dilute desiccant for reconcentration whereby the vaporization and loss of such material is prevented.

Other and more specific objects will be apparent from a reading of the following description and claims.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevation of a gas dehydrator constructed in accordance with this invention and showing the contactor enclosure and the reconcentrator, Fig. 2 is a vertical, sectional view of the reconcentrator, Figs. 3, 4, 5 and 6 are horizontal, cross-sectional views taken upon the respective lines of Fig. 2, Fig. 7 is a vertical sectional view of a modified form of the reconcentrator, Fig. 8 is an enlarged sectional view of the dilute desiccant inlet to the skimming drum, and Fig. 9 is a diagrammatic view showing the flow of fluids in the modification of Fig. 7.

In the drawings, the numeral 10 designates a supporting base or skid upon which there is mounted a contactor enclosure or tower 11 and a reconcentrator 12. If desired, the skid 10 may be formed of closed pipe sections through which the fuel gas for the reconcentrator may be passed and which functions as a surge chamber for the fuel gas to even the flow of the gas to the reconcentrator burner. The gas stream enters the tower 11 through a side inlet 12, flowing upwardly through the tower in countercurrent relation to downwardly flowing desiccant, and leaves the upper end of the tower through an outlet fitting 13 and a downwardly directed outlet pipe 14. Of course, the enclosure or tower 11 may be packed, as with Raschig rings, may be of the nature of a bubble plate tower, or may be otherwise suitably arranged for obtaining thorough and efficient contact between the natural gas stream and the downwardly passing liquid desiccant.

The desiccant is introduced into the tower through an inlet pipe 15 which discharges the liquid desiccant at 16 near the upper end of the tower whereby the desiccant may flow downwardly through the tower and be discharged therefrom in a dilute state through an outlet pipe 17. A float control fitting 18 is arranged to operate a diaphragm valve 19 interposed in the outlet pipe 17 and control the flow of dilute desiccant to the pipe 20 which enters the lower portion of the reconcentrator 12. Reconcentrated desiccant is withdrawn from the reconcentrator 12 by a gas driven or other suitable type of pump 21 and forced under pressure through the inlet pipe 15 into the tower 11. The gas outlet conductor 14 is provided with a branch pipe 22 through which gas flows to a preheating coil within the reconcentrator, to be described hereinafter, the gas flowing from the coil through an outlet pipe 23 to the motive gas inlet 24 of the pump, and also through a branch conductor 25 to the burner unit of the reconcentrator.

Referring now to Figs. 2 through 6 wherein details of the reconcentrator are shown, the numeral 26 designates an upright cylindrical main vessel having a closed bottom or base 27 and a closed top 28. There is provided an intermediate transverse partition 29 in the vessel dividing the same into an upper or heating compartment 30 and a lower or surge chamber 31. A return bend fire tube 32 extends horizontally into the heating compartment 30 through a flanged fitting 33 mounted in one wall of the compartment and is provided with the usual burner (not shown) in one leg 34 of the heater tube, an exhaust or flue gas stack 35 extending upwardly from the opposite leg 36 of the burner. Fuel gas is supplied to the burner and fire tube through the conductor 25, the hot combustion gases passing through the return bend fire tube to the stack 35 and imparting heat in the desired quantities to the compartment 30. If desired, the fuel gas flowing to the burner may pass through a heat exchange coil (not shown) disposed in the upper portion of the surge chamber 31 and having inlet and outlet fittings 37 passing through the wall of the surge chamber.

The dilute desiccant passing from the tower 11 to the reconcentrator, is introduced into a helical heating coil 38 positioned in the bottom portion of the surge chamber 31, entering the coil through an inlet fitting 39 and leaving the coil through an outlet connection 40. The chamber 31 is normally partially full of warm or hot reconcentrated desiccant, and the passage of the dilute desiccant through the coil 38 serves to cool this body of hot reconcentrated desiccant and, at the same time, to preheat the dilute desiccant passing through the coil. The preheating coil in the upper portion of the chamber 31, through which the fuel gas flows by the inlet and outlet 37, may be constructed similarly to the coil 38.

A reflux or reconcentrating tower or column 41 extends upwardly from the head 28 of the vessel 26, the column being in the form of an elongate pipe of relatively small diameter as compared to the vessel 26 and carrying at its upper end a vertical tube bundle 42 opening at its upper end 43 to the lower portion of the tube bundle 42 and is disposed at the upper end of the column 41.

The preheated dilute desiccant leaves the coil 38 through the outlet 40 and passes by a conductor 45 to an inlet fitting 46 extending through the side wall of the skimmer drum or skimming vessel 44 near the top thereof and shown in detail in Fig. 8 of the drawings. This inlet fitting comprises a closed bottom, perforated tube 47 having a shorter reduced diameter open-ended tube 48 extending thereinto. The desiccant entering the coupling 46 passes through the tube 48 and impinges upon the closed bottom of the sleeve 47, from where it passes through the perforations 47' of the sleeve into the interior of the drum 44. By means of this structure, the influent velocity of the desiccant is reduced and dissipated, and relatively quiescent conditions are maintained within the skimmer drum 44.

This dilute desiccant often contains a quantity of distillate or other liquid hydrocarbons which are of value and which may be lost if the desiccant is heated to reconcentrating temperatures without prior removal of the distillate. Hence, the skimmer drum 44 makes provision for stratification therein of the influent desiccant and hydrocarbon, the upper hydrocarbon layer being skimmed off through an outlet fitting 49, while the lower layer of desiccant passes under a vertical partition 50 spaced from the top and bottom walls of the drum 44 and enters into the open upper end of a desiccant overflow pipe 51. The tube bundle 42 has its lower portion exposed to the fluids within the drum 44, and as will appear more fully hereinafter, hot vapors rising upwardly through the tube bundle 42 are cooled to some extent in their passage through the lower portion of the tube bundle by reason of the body of liquid therearound. At the same time, additional preheating is imparted to the dilute desiccant.

The overflow pipe 51 extends downwardly through the bottom of the drum 44 and is connected through a coupling 52 to a desiccant inlet pipe 53 extending through the wall of the column 41 and terminating therewithin in an upturned elbow 54. Thus, the dilute and preheated desiccant is released upwardly in the intermediate portion of the column 41 through which heated vapors are passing upwardly, and the desiccant is permitted to flow or drop downwardly within the column.

Desirably, the column 41 is filled with a suitable packing material, such as the tower rings indicated at 55, although the utilization of such rings is not essential. In the lower portion of the column, below the inlet elbow 54, a section of wire cloth or other foraminous element 56 extends across the column and overlies a diversion plate 57, shown in Fig. 3. The plate 57 has a semi-circular opening 58 underlying one side of the wire cloth 56 and overlying a semi-cylindrical sump 59 formed in the lower extremity of the column 41 by a transverse baffle 60 extending upwardly from the upper wall 28 of the vessel 26 into the lower extremity of the column 41. A discharge pipe 61 extends downwardly from the sump 59 into the heating compartment, the pipe 61 being offset laterally around the fire tube 32 and terminating near the upper surface of the partition 29 at the bottom of the compartment 30. Thus, the preheated dilute desiccant may drain downwardly through the flume 41 while being subjected to the action of the heated vapors rising upwardly through the column, and will pass through the opening 58 into the sump 59 and downwardly through the pipe 61 into the lower portion of the heating compartment 30 below the fire tube 32.

Within the compartment 30, the dilute desiccant is heated to the desired degree to vaporize water therefrom, these vapors passing through a semi-circular opening 62 provided in the upper wall 28 of the heating compartment and opening into the lower end of the column 41 upon that side of the baffle 60 opposite the sump 59. The vapors continue to rise, passing upwardly through the opening 58 countercurrent to the downwardly moving liquid, and on to the outlet 43 of the column. Obviously, some desiccant may be vaporized in the heating step, and in the upward passage of this vaporized desiccant countercurrent to the incoming dilute desiccant, as well as in the cooling of the vapors as they pass upwardly through the column 41 as well as in the tube section 42, substantially all of the desiccant will be condensed and returned by gravity into the heating compartment. Thus, reflux and bubble column conditions are set up to effect efficient and relatively complete separation of the desiccant and water. The desiccant may not be entirely freed of water, but its water content will be reduced to a point at which its water vapor pressure is at the desired level for introduction into the contactor tower 11.

The hot reconcentrated desiccant, from which moisture has been removed in the compartment 30, overflows through an outlet fitting 63 provided near the top of the side wall of the compartment, and passes downwardly through the pipe 64 into the surge chamber 31 through the U-shaped trap 64'. The chamber 31 is of sufficient volume as to accommodate varying flows of desiccant and has a vent fitting 65 connected thereinto through a collar 66 mounted in the side wall of the chamber immediately below the partition 29. The reconcentrated desiccant, having been cooled by its passage over the coils 38, leaves the surge chamber 31 through the outlet fitting 67 near the bottom of the surge chamber and is returned by the pump 21 under pressure into the inlet conductor 15 leading to the contactor tower 11.

In some instances, the reconcentrator must be spaced a considerable distance from the contactor tower, and in cold climates this long flow of desiccant to the contactor enclosure through exposed pipes may result in freezing of the liquid desiccant. Hence, the invention may be modified as illustrated in Fig. 7. In this modification, the heating compartment 30' is enlarged vertically so as to accommodate in the lower portion thereof a heat exchange coil 68, similar to the preheater coil 38. The reconcentrated desiccant leaving the surge chamber 31 through the outlet 67 is optionally conducted through the coil 68 so that the desiccant may pick up considerable heat from the fire tube 32 in the heating compartment 30' prior to its passage to the contactor tower. Preferably, as illustrated diagrammatically in Fig. 9, the reconcentrated desiccant flows from the outlet 67 through a conductor 69 to the pump 21, and then under pressure through a conductor 70 to the coil 68 and thence to the contactor tower 11.

In this manner and with this means, heat may be selectively imparted to the reconcentrated desiccant immediately before the desiccant begins its passage to the contactor tower 11 and insurance against freezing or congealing of the desiccant in this passage is provided.

The form of the invention shown in Fig. 7 is also modified in that the tube bundle 42' is placed entirely above the skimmer drum 44' and communicates with the column 41 through an enlarged cylindrical column section 71 which is surrounded by the drum 44'. Amplified condensing area is thus provided.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a liquid desiccant gas dehydrator, a desiccant reconcentrator including, a main vessel divided into superposed heating and surge chambers, heating means in the heating chamber, a stripping column having one end extending from said main vessel and communicating with the heating chamber, a skimming vessel mounted at the upper end of said column and in heat exchange relationship with the column, a dilute desiccant inlet to the skimming vessel, a liquid hydrocarbon outlet from the skimming vessel, a desiccant outlet from the skimming vessel, a desiccant conduit having an inlet to the column and connected to the desiccant outlet from the skimming vessel, a vapor outlet from the column, a reconcentrated desiccant outlet from the surge chamber, and a desiccant conductor for conveying reconcentrated desiccant from the heating chamber to the surge chamber.

2. A desiccant reconcentrator as set forth in claim 1 and a heat exchange coil in said main vessel connected to the dilute desiccant inlet to the skimming vessel for preheating dilute desiccant entering the skimming vessel.

3. A desiccant reconcentrator as set forth in claim 1, and a reconcentrated desiccant heat exchange coil in the vessel connected to the reconcentrated desiccant outlet from the surge vessel.

4. A desiccant reconcentrator as set forth in claim 3, and a pressurizing pump between the heat exchange coil and the reconcentrated desiccant outlet.

5. A desiccant reconcentrator as set forth in claim 1 wherein the skimming vessel is provided with an internal baffle closely spaced to the bottom of the chamber and interposed between the desiccant outlet from the skimming vessel and the dilute desiccant inlet to the skimming vessel.

6. A desiccant reconcentrator as set forth in claim 1 wherein the stripping column extends vertically upwardly from the upper wall of the heating chamber, a transverse baffle dividing the lower portion of the column into two sections, a transverse partition in the column above the baffle having a drain opening overlying one of said sections, a drain conductor extending from the latter section downwardly into the heating chamber below the heating means, and the other section having an opening extending between the column and the heating chamber and underlying an imperforate portion of said transverse partition.

References Cited in the file of this patent

UNITED STATES PATENTS

| | | |
|---|---|---|
| 798,724 | Corcoran | Sept. 5, 1905 |
| 2,367,695 | Spiselman | Jan. 23, 1945 |
| 2,428,643 | Young | Oct. 7, 1947 |